United States Patent Office

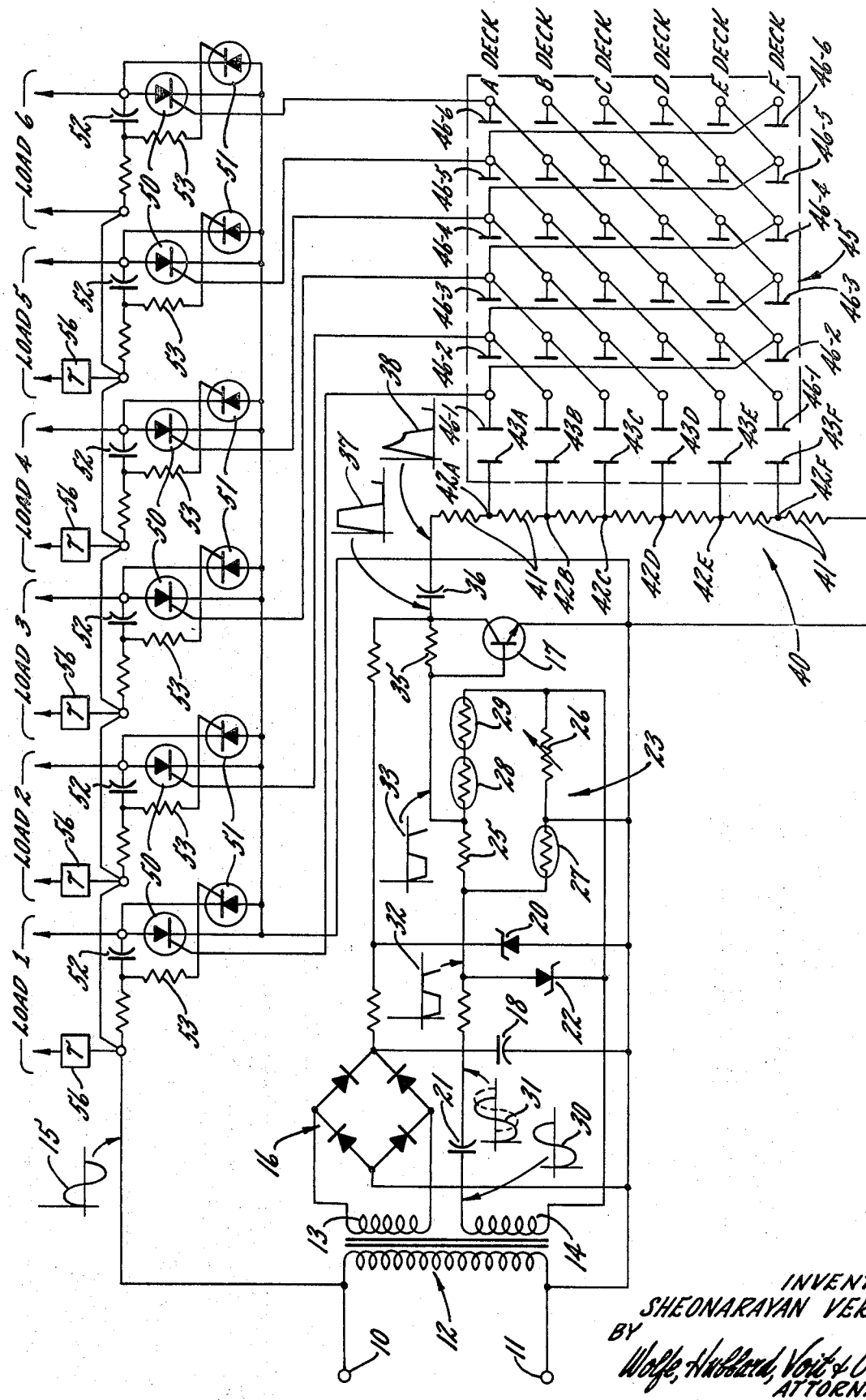

3,529,173
Patented Sept. 15, 1970

3,529,173
INCREMENTAL MODULATING CONTROLLER FOR ELECTRICAL APPARATUS
Sheonarayan Verma, Michigan City, Ind., assignor to Weil-McLain Company, Inc., Michigan City, Ind., a corporation of Indiana
Filed Feb. 5, 1968, Ser. No. 702,869
Int. Cl. H02j *3/14*
U.S. Cl. 307—41
13 Claims

ABSTRACT OF THE DISCLOSURE

A controller is described for electrical loads which are progressively energized in sequential fashion according to variations in one or more control conditions. Sensing elements are used in a bridge circuit to trigger the energization of one or more electrical loads, and the order of energization is selectively shiftable by means of a selector switch.

---

This invention relates to the control of a plurality of electrical loads in response to variations in one or more control conditions. In one principal aspect the invention provides a means of selectively varying the order or sequence of energization of electrical loads in response to the varying conditions.

Selective modulation of electrical loads is required in many applications. In outdoor lighting systems, for example, the number of illumination units energized in a given time might depend on the amount of sunlight available at various times during the day. As the day dwindles, one or more of a number of individual lighting units may be required to maintain a predetermined level of illumination.

Similar applications are found in temperature control of buildings. In an air-conditioning system, one or more compressors or refrigeration units may be energized in response to the variation of temperature within the control region. The same is true with heating units, wherein a gas or oil-fired boiler may be controlled by an electrical system in which each heating unit represents an electrical load for the controller. Many modern buildings employ electric heat exclusively, and in these installations each heating unit comprises an electrical load of considerable size.

While the above examples illustrate applications in which the electrical loads are required to be energized in varying numbers according to a demand indicated by a single control condition, there are other applications in which it is desired that more than one control condition should be effective to change the energization of the various loads. In a heating system, for example, the primary control variable will be the temperature of the controlled area, but other factors can also be of importance. Outside air temperature and wind velocity will also be signficant factors in heating a home or office building. A fall in outside temperature or increase of outside wind velocity will each increase the rate of heat lost through doors, windows, and regions of poor insulation. A heating system which depends solely on the temperature of the will quite often be slow in responding to demand or will tend to leave cold spots in regions where heat losses are greatest during when unfavorable outside conditions.

The variables selected for use in controlling the system may relate in simple fashion, such as in a temperature differential between inside and outside air temperature, or in a more complex manner in the case of wind velocity. While the intended system temperature might not change in the case of increasing wind velocity, an increased response to an incremental variation from the desired temperature is desirable. Stated another way, the response of the heating system to a drop in the controlled temperature below the desired level will still be proportional to the differential temperature, but the factor of proportionality is desirably varied according to the wind velocity so that a temperature change on a windy day will be met by a greater response from the heating elements than would the same temperature change on a calm day.

In air-conditioning systems, whereoin the object is to lower the controlled temperature rather than raise it, similar considerations are present. Even though the primary control condition may be inside temperature, outside temperature and wind velocity must also be taken into consideration to assure optimum system operation.

In any such system wherein a modulating controller causes a plurality of loads to be energized sequentially rather than simultaneously, energization must occur according to a predetermined order. Progressively larger variations in the control condition result in the energization of first one load, then another, then yet another and so on as the system response is thus proportionally increased. It can be seen that under normal operating conditions the last load to be energized is also the one which will be most seldom used, since most control condition variations will be more limited and will bring into operation only the first few loads of the series.

Where large electrical loads are involved, such as with heating units or electric motors which have a large current during starting, it is also desirable to avoid the simultaneous energization of several electrical loads. Instead, it is advantageous to energize them in a timed sequence so that each one is turned on separately. This is particularly true of inductive loads of the type represented by electric motors and the like.

A further problem confronting heating engineers is how to operate modulating control systems if one of several independent serially operated loads, such as a heating element or a refrigeration unit, should fail. The proportional response of such a system is seriously disrupted if the first unit in line is taken out of service. The second unit, which would normally come into use only when the temperature differential became great enough to demand the energization of two units, is at this point the only unit energized because of the failure of the first unit. The resultant response to the control temperature differential is thus only half effective. An equally unacceptable situation occurs when the second unit, rather than the first, is out of service for any reason. While the response of the system to a small variation in temperature is normal since only the first unit is called upon, a further variation which would otherwise bring the second unit into play results in no increase in system response. Instead, the system remains unchanged until the temperature differential reaches a point where the third unit becomes energized, which would still mean that the system is operating only at two-thirds capacity.

In view of the foregoing requirements, it is a principal object of the present invention to provide an electronic modulating control system for electrical loads which is effective to selectively energize one or more loads in response to the variation of a control condition from a predetermined norm. It is contemplated that the system shall be effective to control a plurality of electrical loads in response to simultaneous variations in one or more control conditions.

A further object is to provide means for switching the order of energization of a series of such loads so that a faulty load unit may be taken out of its place in the series for servicing without affecting the operation of the system.

A more detailed object is the provision of an electronic control system for use in temperature control systems for houses and other buildings in which the controller is desirably responsive to additional conditions, such as outside air temperature and wind velocity, in addition to the temperature of a controlled space. It is particularly intended that the control system of the present invention be adapted for use in a heating system employing electrically-energized or electrically-controlled heating elements, or gas and oil boilers having multiple electrically-controlled burners.

A related object is the provision of a modulating control system of the foregoing description in which the individual electrical loads are energized in serial fashion during all conditions of response, including sudden changes in which more than one load is called upon for enerization at a time. This result is to be achieved even when the loads are shifted in their energization sequence for the purpose of shifting a defective load unit out of the normal sequence so that it may be serviced without disrupting the operation of the rest of the system.

Other objects and advantages of the invention will become apparent by reference to the drawing, in which:

FIG. 1 is a schematic circuit diagram of a modulating control system embodying the present invention.

While the invention will be described in connection with a particular exemplary embodiment, it will be understood that it is not intended to so limit the invention, but it is instead intended to cover all alternative and equivalent constructions as may be included within the spirit and scope of the invention as defined by the appended claims.

Turning to the drawing, there is shown in FIG. 1 a modulating control system in which the invention is exemplified. For purposes of the illustrative embodiment, the system is illustrated in connection with a heating system employing individual electrical loads, loads 1–6, which may be energized individually or collectively. Such a system might be used, for example, to heat water in an electric boiler for a hot-water heating system.

Power for operation of the system and its associated loads is received through line terminals 10, 11. A power transformer 12 takes a portion of the current received through the terminals 10, 11 and supplies power at a reduced voltage through each of a pair of secondary windings 13, 14. (The input voltage is represented by the wave form 15.) The secondary winding 13 supplies current to a bridge rectifier 16, and the D-C voltage thus created is used as the plate supply for an amplifying transistor 17. A filter capacitor 18 is employed to eliminate voltage ripple, and a Zener diode 20 is also placed across the rectified output to regulate the resulting D-C voltage. A phase shift capacitor 21 is also provided at this stage for the purpose of reducing radio frequency interference, as will be explained in greater detail hereinafter. Another Zener diode 22 is employed in this portion of the circuit for voltage regulation purposes.

The sensing portion of the circuit is energized by the A-C output of the secondary winding 14 which is now 180° out of phase from the wave form 15. The sensing circuit includes a sensing bridge 23 having a fixed impedance 25, a variable impedance 26, a condition-responsive variable impedance 27, and an additional pair of condition-responsive impedances 28, 29 located in the same arm of the bridge. The phase shift capacitor 21 differentiates the wave form 30 to give a wave form 31, which leads the wave form 30 by 90°. The clipped wave form 32 appearing thereafter results from the Zener diode 22. When the bridge 23 is unbalanced, the resultant wave form appearing at the output terminals of the bridge therefore appears also as a clipped shape 33. A balanced bridge 23 represents a normal condition of the control variables wherein there is no output at all, and thus no wave shape will appear.

During conditions of unbalance, the output signal represented by the wave shape 33 is impressed on the base of the transistor 17 and is thence amplified. The base bias voltage for transistor 17 is obtained through the use of a bias resistor 35. The value of the resistor 35 is chosen so that the transistor 17 operates slightly below its saturation point during periods of no input signal, that is, when the bridge 23 is balanced. The negative going cycle of the bridge output wave form 33 makes the base of transistor 17 more negative, causing collector current to decrease, and as a result of this the collector voltage increases. Thus the negative-going cycle of wave form 33 is amplified by the transistor 17 and becomes a positive-going cycle at its output.

The amplified output signal from the transistor 17 is then directed through a feed-through capacitor 36 and its chopped output wave form 37 changed to a peaked wave form 38. The latter is impressed upon a voltage divider circuit 40 comprising a plurality of individual resistors 41 connected in series. Between each of the voltage divider resistors 41 there is connected one of a plurality of output terminals 42A to 42F which are connected to a signal distribution network 45 herein shown as a multi-position rotary switch. The switch 45 conveys fractional portions of the amplified signal from the bridge to voltage responsive switching means controlling the various electrical loads 1 to 6. From the circuit diagram it can be seen that the voltage divider circuit 40 is effective to divide the amplifier output signal from the bridge into fractional portions such that the magnitude of the voltages appearing at the successive output terminals 42A to 42F in the voltage divider circuit is progressively diminished. In other words, the amplified output signal from the bridge (of the wave form 38) is diminished by the voltage drop across one voltage divider resistor 41 at the first output terminal 42A, by the drop across two voltage divider resistors 41 at the second output terminal 42B, by the drop across three output divider resistors 41 at the third output terminal 42C, and so on for the other terminals 42D to 42F.

The voltages at the successive output terminals 42A to 42F are directed to switch input contacts 43A to 43F of the rotary switch 45 which is a multi-deck switch with decks A to F of output contacts 46–1 to 46–6. Each input contact 43A to 43F is connected to an individual wiper arm which engages one of the output contacts of the associated deck. By this means the progressively diminished fractional output voltages supplied to the rotary switch 45 are conveyed to the voltage responsive switching means. In carrying out one aspect of the invention, by means of the switch 45, the order in which loads 1–6 are energized may be changed, for example, to provide an arrangement described more fully below for changing the order in which the loads are added responsive to progressive increase in demand.

In carrying out the invention, the voltage-responsive switching means preferably consist of silicon-controlled rectifiers, commonly known as SCR's. The operating signal obtained from each of the individual output contacts 46 is led to the gate terminal of an SCR 50. When energized, each SCR 50 conducts during positive-going cycles of the trigger signal voltage. For each SCR 50 another SCR 51 is also employed to conduct during the negative-going cycles of the trigger signal voltage. Each SCR 51 is slaved to the associated SCR 50 and will not trigger unless its associated SCR 50 is also triggered. This is accomplished by the provision of a capacitor 52 which charges during the conductive phase of the SCR 50. When conduction ceases, the capacitor 52 discharges through a resistor 53 to the gate of the second SCR 51 which is thereby triggered during the negative-going cycle of the same signal. In this way each load is supplied with power during the full wave of the trigger signal.

As previously described, the wave form 30 is differentiated by the phase shift capacitor 21 into the wave form 31 which leads the wave form 30 by 90°. Thus the peak of wave form 38 will fall on very close to the zero crossing point of the line voltage wave form 15. The purpose of this arrangement is to cause the SCR's 50, 51 to trigger at or close to the zero point of the line voltage cycle where the voltage across them is nearly zero, thereby eliminating radio frequency interference which would otherwise be caused by voltage transients during triggering.

As a principal feature of the invention, the electrical loads associated with the controller are sequentially and cumulatively energized in a predetermined order so that more loads are added as the demand increases. All of the SCR's 50 and 51 are preferably matched for similar characteristics so that the potential required to trigger each voltage responsive switching pair of SCR's 50 and 51 is approximately the same. The voltage divider network 40 is preferably, though not necessarily, provided with resistors 41 of chosen predetermined characteristics so that the output voltage 38 is divided into substantially uniform increments. As a result, the loads are caused to be progressively energized in serial fashion in response to the increase of the signal voltage so that the response is proportioned to suit the demand reflected by the sensing bridge circuit 23. Alternatively, the voltage divider resistors 41 can be selected to provide a non-linear response characteristic such that a given increase in output voltage will have a different effect, depending on how many loads have already been energized at that point.

As a further feature of the invention, the bridge circuit 23 containing the condition-responsive impedances 27, 28 is designed to provide a compensating effect during certain types of applications whereby the system is made responsive to more than one variable. For instance, in an outdoor illumination system it may be desirable to illuminate a portion of the system either more or less brightly than would be the case from natural daylight alone. A museum having a large window area is such an example. In this application, one variable impedance 27 might desirably be a photocell which is positioned to detect the ambient light falling on the area to be controlled, while the variable impedance 28 on the opposite side of the bridge circuit 23 could be another photocell disposed to detect the ambient light external to the controlled area. The system thus functions with two control inputs such that illumination of the area is controlled approximately according to a ratio of the illumination falling on the controlled area and the illumination available from natural daylight. In this example, the variable impedance 26 might be eliminated, or else be used as an adjustment to set the null value of the variable condition. The variable impedance 29 would not be included.

To illustrate another example, the heating system of a building might desirably be responsive in the first instance to internal temperature, and in addition be responsive to external temperature and wind velocity. In this case, the variable impedance 27 might be a temperature sensing element responsive to the temperature in the region to be controlled, while the variable impedance 28 in the opposite leg of the bridge circuit 23 might be a temperature sensitive element responsive to outside temperature. With such an arrangement, when internal temperature rises above the null value selected by setting the variable impedance 26, a corresponding decrease in outside temperature restores the balance of the bridge 23. The system is thus ratio-responsive rather than responsive only to amplitude changes in the controlled temperature. In addition to these variables, a third variable of wind velocity can be added by making the variable impedance 29 in the bridge 23 responsibe to increases in the wind velocity. Since increasing wind velocity results in greater rates of heat loss, the system responds to such increases by causing the addition of more loads for a given increment of temperature drop until the controlled temperature rises to a point wherein the response from the variable impedance 27 again brings the output of the bridge circuit 23 to its null value.

According to another aspect of the invention, the order in which the individual loads are energized may be selectively changed by rotation of the switch 45 which comprises the distribution network. In the illustrated exemplary embodiment, the switch 45 is a common rotary type having multiple wipers ganged to a common shaft (mechanical details are not shown). Each individual input contact 43A to 43F is connected to a movable wiper arm which engages a different output contact 46-1 to 46-6 of one of decks A to F at each individual rotational position of the switch shaft. Referring to the digrammatic representation of the rotary switch 45 in the figure, each horizontal row of output contacts 46-1 to 46-6 represents a deck of output contacts of the switch and is designated A deck to F deck. The vertical row of input contacts 43-A to 43-F represents the contacts connected to the shiftable ganged wiper arms each of which selectively engages one contact of the corresponding horizontal row of terminals as the switch is rotated.

Since the arrangement of each deck of output contact terminals in the usual rotary switch is in a circular pattern, each wiper arm of the switch 45 (in the present example) would be progressively shiftable through six contact positions until the original position is again obtained. In practice, this aspect of the invention provides the feature of allowing the operator to take a defective load or set of SCR's 50, 51 out of its prevous order in the energization sequence and move it to the far end of the sequence where it would seldom be called upon during normal operation of the system. In this position it can be taken out and serviced without disrupting the operation of the rest of the system. Another advantage from such an arrangement is that the sequence of energization of the loads may be regularly varied in a systematic fashion in order to average out energization during use so that the total utilization of any individual load is substantially the same as the others. This has the advantage of helping to prevent premature failure of any individual one of these elements and their associated circuitry. In the present example, a six-position switch is shown, but it will be appreciated that additional positions could be added to provide for spare loads and associated circuitry or for other uses. In this way the switch 45 could be rotated to bring a defective load element into the unused position, whereupon it could be serviced while the system continued to work in normal manner.

In carrying out the invention, it is often desirable to provide means whereby the individual load elements will not be called upon for simultaneous energization. Inductive loads, such as electric motors, often draw considerably larger current during starting conditions than while running, and so it is often necessary to make sure that no two loads are energized simultaneously. In the present invention, this is accomplished by the provision of a number of time delay relays 56 which introduce a predetermined delay time into the energization of the loads. When the SCR's 50, 51 associated with an individual load are energized, the load itself is not energized until the time delay relay 56 associated with the load allows the circuit to be completed. As may be seen from the figure, there are six such loads, but only five relays. The load not having a relay, load 6, is thus energized immediately upon the triggering of its associated SCR's 50, 51, while the other loads are each delayed by a predetermined time interval. Each relay 56 is then set for a different predetermined time interval from the others such that simultaneous energization of all the load circuits is avoided. Stated another way, where there are a total of $n$ loads, there are desirably $n-1$ time delay relays, each set to provide a different delay time.

I claim as my invention:

1. Apparatus for successively energizing a plurality of electrical loads affecting a control condition in accordance with the deviation of said control condition from a predetermined norm so as to change said control condition towards said predetermined norm, comprising:

first circuit means for producing a control signal the magnitude of which varies in accordance with the difference between said control condition and said predetermined norm;

second circuit means for dividing said control signal into a plurality of fractional control signals; and a plurality of voltage-responsive switching means each being effective to control the input of electrical energy into one of said loads with respective ones of said switching means being responsive to a different one of said fractional control signals whereby variations in said control signal in response to a growing difference between said control condition and said predetermined norm cause energization of successive ones of said loads in a manner tending to reduce said difference, and whereby as said difference gradually decreases in response to the energization of said loads said loads are successively de-energized.

2. Apparatus for successively energizing a plurality of electrical loads affecting a control condition in accordance with the deviation of said control condition from a predetermined norm so as to change said control condition towards said predetermined norm, comprising:

first circuit means for producing a control signal the magnitude of which varies in accordance with the difference between said control condition and said predetermined norm;

second circuit means for dividing said control signal into a plurality of fractional control signals;

a plurality of voltage-responsive switching means each being effective to control the input of electrical energy into one of said loads with respective ones of said switching means being responsive to a different one of said fractional control signals whereby variations in said control signal in response to a growing difference between said control condition and said predetermined norm cause energization of successive ones of said loads in a manner tending to reduce said difference, and whereby as said difference gradually decreases in response to the energization of said loads said loads are successively de-energized; and means connected between said circuit means and said plurality of switching means for varying the sequence in which said plurality of switching means is energized in response to said control signal.

3. A modulating controller for successively energizing a plurality of loads in accordance with the deviation of a control condition from a predetermined norm, comprising:

sensing circuit means including a source of alternating electrical energy, a bridge circuit connected to said source and having an arm including a variable impedance, said impedance being variable in response to variations in said control condition, and output terminals connected to said bridge circuit whereby a signal voltage is produced at said output terminals which varies according to the deviation of said control condition;

voltage divider circuit means including a plurality of impedances serially connected across said output terminals and having control signal terminals at the connection points of said impedances;

a plurality of voltage-responsive switching means each being effective to control the energization of one of said loads upon the application of an energization control signal voltage of predetermined value; and a signal distribution network interconnecting said voltage-responsive switching means and said output terminals in said voltage divider circuit means, whereby said loads are progressively energized in response to deviation of said control condition.

4. A controller as defined in claim 3 in which each of said voltage-responsive switching means is effective to switch its associated load from a de-energized condition to an energized condition upon the application of a signal voltage of substantially the same predetermined value, and in which said voltage divider circuit means is effective to divide said signal voltage into substantially uniform increments whereby said loads are caused to be progressively energized in serial fashion in response to deviation of said control condition.

5. A controller as defined in claim 4 in which each of said voltage-responsive switching means includes a silicon controlled rectifier.

6. A controller as defined in claim 3 in which said signal distribution network means includes a distribution switch, said switch comprising:

a plurality of input contact terminals, each of said input contact terminals being electrically connected to one of said control signal terminals;

a plurality of output terminals co-acting with said input contact terminals and shiftable with respect thereto, said output contact terminals being electrically connected to said voltage-responsive switching means; and mechanical rotating means for selectively registering said input contact terminals with said output contact terminals in a plurality of shifted positions, whereby each of said voltage-responsive switching means may be selectively electrically associated with any one of said signal output terminals.

7. A controller as defined in claim 3 including a time delay relay between each of said voltage-responsive switching means and its associated signal output terminal, with each of said relays being effective to cause a different predetermined time interval between the occurrence of an energization control signal and energization of the corresponding load.

8. A controller as defined in claim 3 having $n$ control signal terminals and including a time delay relay between $n-1$ of the loads and their associated voltage-responsive switching means, with each of said relays being effective to cause a different predetermined time interval between the occurrence of an energization control signal and energization of the corresponding load.

9. A controller as defined in claim 3 in which said loads comprise electrical heating elements in a heating system, and in which said variable impedance is operably responsive to a deviation in sensed temperature within said heating system.

10. A controller as defined in claim 3 in which said bridge circuit arm includes a plurality of variable impedances, each said impedance being variable in response to the variation of a separate control condition.

11. A controller as defined in claim 3 in which said bridge circuit includes two arms each having a variable impedance, each said impedance being variable in response to the variation of a separate control condition.

12. A controller as defined in claim 11 in which said loads comprise electrical heating elements in a heating system, said variable impedances in one said arm being operably responsive to a deviation in sensed temperature within said heating system, and said impedances in the other arm being operably responsive to a deviation in sensed temperature exterior to said heating system.

13. A controller as defined in claim 11 having a third variable impedance in said bridge circuit, said third variable impedance being operably responsive to a deviation in wind velocity external to said heating system.

References Cited

UNITED STATES PATENTS 3,286,613   6/1966   Felcheck et al.
3,205,368   9/1965   Miracle _____ 307—41 X ROBERT K. SCHAEFER, Primary Examiner H. J. HOHAUSER, Assistant Examiner U.S. Cl. X.R.

317—139